United States Patent
Shaar

(10) Patent No.: US 6,421,118 B1
(45) Date of Patent: Jul. 16, 2002

(54) METHOD OF MEASURING CONCENTRICITY OF AN OPTICAL FIBER

(75) Inventor: Casey S. Shaar, Portland, OR (US)

(73) Assignee: GN Nettest (Oregon), Inc., Beaverton, OR (US)

( * ) Notice: Subject to any disclaimer, the term of this patent is extended or adjusted under 35 U.S.C. 154(b) by 0 days.

(21) Appl. No.: 09/643,146

(22) Filed: Aug. 21, 2000

(51) Int. Cl.[7] .............................................. G01N 21/00
(52) U.S. Cl. ...................................................... 356/73.1
(58) Field of Search ................................. 356/73.1, 426, 356/376; 382/141, 151, 152, 288; 385/59, 60, 71, 76, 89

(56) References Cited

U.S. PATENT DOCUMENTS 4,563,087 A * 1/1986 Bourbin et al. ............ 356/73.1

* cited by examiner

Primary Examiner—Frank G. Font
Assistant Examiner—Tu T. Nguyen
(74) Attorney, Agent, or Firm—John Smith-Hill; Smith-Hill and Bedell

(57) ABSTRACT

Concentricity of an optical fiber segment is determined by positioning the fiber segment with its central axis substantially coinciding with an axis of rotation, the fiber segment being in a first angular position about the axis of rotation, imaging the end face of the fiber on a detector, and measuring the location of the image of the center of the core relative to the location of the image of the center of the cladding in the first angular position. The fiber segment is then rotated about the axis of rotation to a second angular position and the location of the image of the center of the core relative to the location of the image of the center of the cladding in the second angular position is measured. The fiber segment is again rotated about the axis of rotation to a third angular position and the location of the image of the center of the core relative to the image of the center of the cladding in the third angular position is measured. The radius of the circle that circumscribes the locations of the image of the center of the core relative to the image of the center of the cladding is then calculated.

3 Claims, 1 Drawing Sheet

METHOD OF MEASURING CONCENTRICITY OF AN OPTICAL FIBER

BACKGROUND OF THE INVENTION

This invention relates to a method of measuring concentricity of an optical fiber.

Referring to FIG. 1, an optical fiber is composed of a core 12 of high refractive index material surrounded by a cladding 14 of low refractive index material. In cross-section, the core and the cladding are substantially circular. Ideally, the core 12 and the cladding 14 are concentric, as shown in FIG. 1. However, current techniques for manufacture of optical fibers do not ensure that the core and the cladding are in fact concentric. An important measure of the quality of an optical fiber is the concentricity of the fiber, which is defined as the magnitude of the distance of the center of the core from the center of the cladding.

It is known to measure geometrical characteristics of an optical fiber by cleaving the fiber and employing a lens to image the end face of the optical fiber on a CCD sensor, which generates an electrical signal representative of intensity of illumination of the sensor as a function of position in the image plane by reference to a Cartesian coordinate system. This electrical signal constitutes an electronic image of the end face of the optical fiber and can be used to generate a video signal for driving a monitor to display a visually perceptible image of the end face of the fiber.

Using conventional image processing software, it is possible to analyze the electronic image generated by the CCD sensor and calculate the locations of a first group of points on the periphery of the image of the cladding and calculate the equation of a circle 16 (FIG. 2) that optimally fits the first group of points and calculate the locations of a second group of points on the periphery of the image of the core and calculate the equation of a second circle 18 that optimally fits the second group of points. It is then possible to calculate the distance $\Delta X$, $\Delta Y$ along each axis of the coordinate system between the centers of the two circles. The magnitude of the distance D between the centers of the two circles is equal to $$\sqrt{(\Delta X^{2+\Delta=Y^2})}$$

If the imaging system were perfect, the magnitude of the distance D between the centers of the two circles, scaled to take account of the magnification of the imaging system, would be equal to the concentricity of the fiber. However, imperfections in the imaging system introduce an error such that in fact the image of the core is offset by an error vector E from the position 18' that it would occupy if the imaging system were perfect and accordingly the true value D' of the distance between the centers of the two circles is equal to D-E. The concentricity of the fiber is equal to the magnitude of D-E.

It has been observed that if the fiber segment is rotated about the central axis of the cladding, the image of the center of the core describes a circular path and it can be shown that the center of the circular path is displaced from the image of the center of the cladding by a distance equal to the magnitude of the error vector (scaled to take account of the magnification of the imaging system). This observation has hitherto been used to demonstrate the existence of the error vector. However, to the inventor's knowledge no other practical use has been made of this observation.

SUMMARY OF THE INVENTION

In accordance with the invention, it has now been recognized that the radius of the circular path described in the image of the center of the core when the fiber is rotated (scaled to take account of the magnification of the imaging system) is equal to the magnitude of the concentricity vector and that the concentricity of the fiber can be calculated-by measuring the radius of this circular path.

In accordance with a first aspect of the invention there is provided a method of determining concentricity of an optical fiber segment composed of a cladding and a core, both substantially circular in cross-section, the fiber segment having an end face and the core and the cladding having respective centers in the end face, and the fiber segment having a central axis extending through the center of the cladding, the method including positioning the fiber segment with the central axis of the fiber segment substantially coinciding with an axis of rotation, the fiber segment being in a first angular position about the axis of rotation, imaging the end face of the fiber on a detector, measuring the location of the image of the center of the core relative to the location of the image of the center of the cladding in the first angular position, rotating the fiber segment about the axis of rotation to a second angular position and measuring the location of the image of the center of the core relative to the location of the image of the center of the cladding in the second angular position, rotating the fiber segment about the axis of rotation to a third angular position and measuring the location of the image of the center of the core relative to the image of the center of the cladding in the third angular position, and calculating the radius of the circle that circumscribes the locations of the image of the center of the core relative to the image of the center of the cladding.

In accordance with a second aspect of the invention there is provided a method of determining concentricity of an optical fiber segment composed of a cladding and a core, both substantially circular in cross-section, the fiber segment having an end face and the core and the cladding having respective centers in the end face, and the fiber segment having a central axis extending through the center of the cladding, the method including (a) positioning the fiber segment with the central axis of the fiber segment substantially coinciding with an axis of rotation, the fiber segment being in a first angular position about the axis of rotation, (b) employing an imaging system to create an image of the end face of the fiber, (c) measuring the location of the image of the center of the core relative to the location of the image of the center of the cladding in the first angular position, (d) effecting relative rotation of the fiber segment and at least one element of the imaging system about the axis of rotation to a second angular position and measuring the location of the image of the center of the core relative to the location of the image of the center of the cladding in the second angular position, (e) effecting relative rotation of the fiber segment and said at least one element of the imaging system about the axis of rotation to a third angular position and measuring the location of,the image of the center of the core relative to the image of the center of the cladding in the third angular position, and (f) calculating the radius of the circle that circumscribes the locations of the image of the center of the core relative to the image of the center of the cladding.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
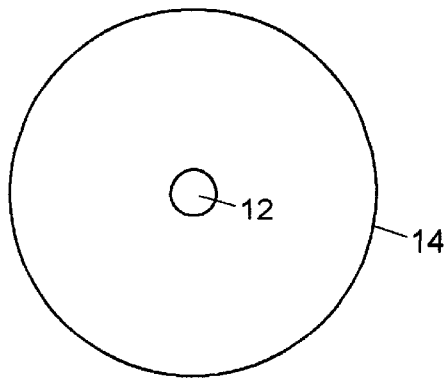
FIG. 1 illustrates an image of an end face of an optical fiber segment in which the core is concentric with the cladding.
Figure 2:
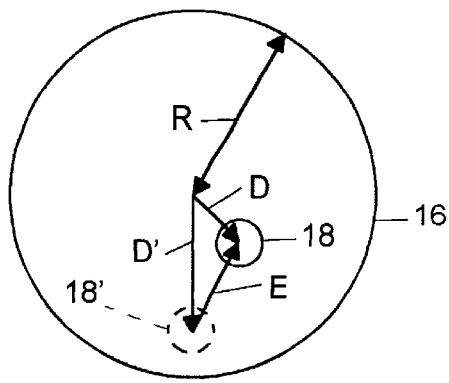
FIG. 2 illustrates an image of an end face of an optical fiber segment in which the core is not concentric with the cladding.
Figure 3:
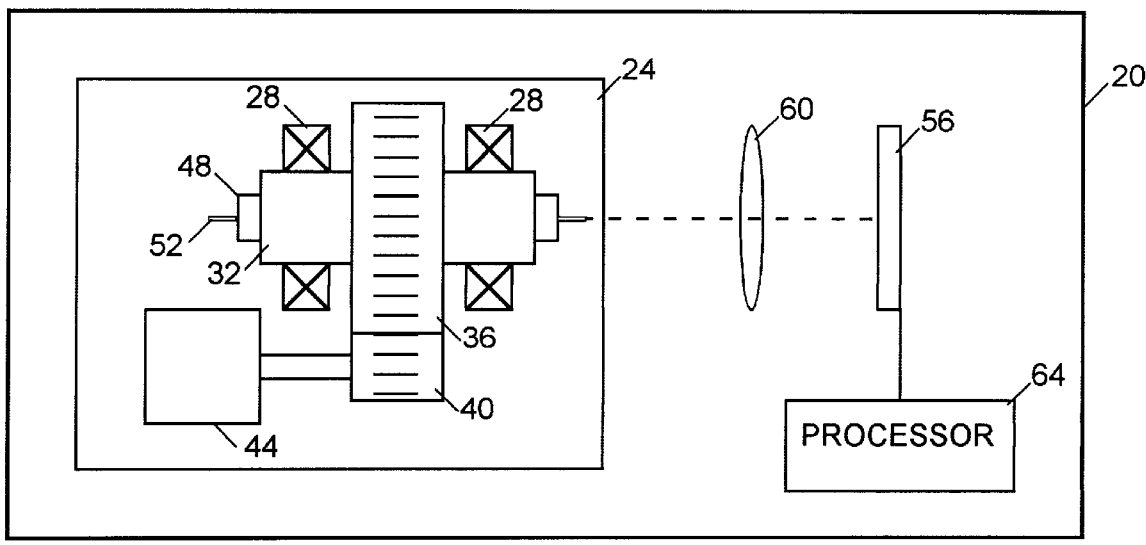
FIG. 3 is a top plan view of apparatus for carrying out a method in accordance with the present invention.
Figure 4:
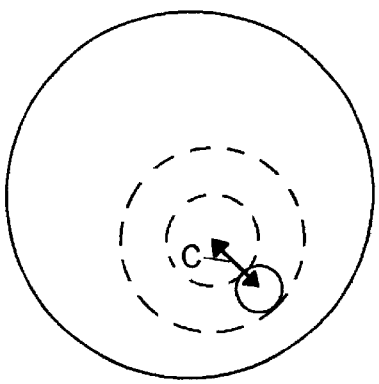
FIG. 4 illustrates an image of an end face of an optical fiber segment and illustrates the path of the image of the core as the fiber segment is rotated about the center of the cladding.

The apparatus shown in FIG. 3 includes a frame 20 on which an XYZ stage 24 is mounted in a manner that allows linear movement of the stage 24 relative to the frame 20 along three mutually perpendicular axes. The stage 24 supports a bearing 28 in which a chuck 32 is journalled. The chuck has an external spur gear 36 in meshing engagement with a pinion 40 which is driven by an indexing motor 44. Consequently, the motor 44 drives the chuck 32 to rotate stepwise about the axis of rotation defined by the bearing 28. The chuck 32 releasably receives a fiber holder 48. The fiber holder receives and grips a fiber segment 52 having a cleaved end face. The fiber segment 52 is oriented along a Z-axis which coincides with a high degree of precision with the axis of rotation of the chuck 32. Consequently when the fiber holder 48 is fitted in the chuck 11 and contains a length segment of a fiber under test, the fiber under test rotates stepwise about the axis of the chuck 32.

The instrument also includes a CCD sensor 56 and a lens 60 which are mounted stationarily on the frame 20. The CCD sensor and the lens together form a digital video microscope. One end face of the fiber segment 52 is presented towards the lens and the core and the cladding at that end face are illuminated so that they can be viewed through the microscope. By operating the XYZ stage 24, the fiber holder 28 is brought to a position in which the end face of the fiber segment is imaged by the lens on the sensor 56 and the image of the end face is at a desired position relative to the active area of the sensor. The sensor 56 generates an electrical signal representative of the intensity of illumination of the sensor as a function of position over the active area of the sensor with reference to a two-dimensional Cartesian coordinate system. The electrical signal is digitized and the resulting digital signal is supplied to a processor 64. The processor uses image processing software, operating using known principles, to analyze the electronic image generated by the CCD sensor and identify the image of the periphery of the cladding and the image of the periphery of the core and to calculate the locations (relative to the Cartesian coordinate system) of the geometrical center of the image of the cladding and the geometrical center of the image of the core.

Let us assume that the center of the cladding is at the origin of the Cartesian coordinate system and that at a first angular position of the chuck, the center of the core is at the point P1.

If we then rotate the chuck through 120° and acquire a second image of the end face of the fiber segment, the image of the center of the cladding is at the origin and the image of the center of the core is at the point P2. If we rotate the chuck through a further angle of 120° and acquire a third image of the end face of the fiber, the image of the center of the cladding is at the origin and the image of the center of the core is at the point P3. The three points P1, P2 and P3 lie on a circle which is referred to herein as the concentricity circle. Given the coordinates of the three points P1, P2 and P3, it is possible to calculate the radius C of the concentricity circle. This radius value C is equal to the magnitude of the concentricity vector, scaled to take account of the magnification M of the imaging system. Consequently, the concentricity of the fiber is equal to the radius C divided by the magnification M.

In the event that the image of the center of the cladding is not at the origin when the chuck is in the second or third angular position, for example because the central axis of the fiber does not coincide with the axis of rotation of the chuck to a sufficient degree of precision, the XYZ stage 24 can be used to displace the fiber perpendicular to the Z axis to bring the fiber to a position such that the image of the center of the cladding is at the origin prior to calculating the coordinates of the image of the center of the core. Alternatively, it is possible to transform the image mathematically to compensate for any difference between the actual position of the image of the center of the core and the position that the image of the center of the core would have if the image of the center of the cladding were at the origin.

It will be appreciated that it is not essential to rotate the fiber while the microscope remains stationary on the frame 20, and that it is necessary only that there be relative rotation of the fiber and the component(s) that cause the imperfection in the imaging system. Accordingly, although it is preferred that the fiber should be rotated, because it is possible to locate the fiber so that it coincides with a high degree of precision with the axis of rotation of the chuck, it would in principle also be possible to rotate the microscope. Further, if it should be shown that the imperfection resides in the lens, and that component(s) downstream of the lens do not contribute significantly to the imperfection, it would be acceptable to rotate the lens alone.

It will be appreciated that the invention is not restricted to the particular embodiment that has been described, and that variations may be made therein without departing from the scope of the invention as defined in the appended claims and equivalents thereof. For example, the invention is not restricted to use of three measurements to calculate the radius of the concentricity circle and generally many more measurements will be made and the radius calculated by determining the circle the best fits the distribution of points C by a least sum of squares algorithm. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

I claim:

1. A method of determining concentricity of an optical fiber segment composed of a cladding and a core, both substantially circular in cross-section, the fiber segment having an end face and the core and the cladding having respective centers in the end face, and the fiber segment having a central axis extending through the center of the cladding, the method including:

positioning the fiber segment with the central axis of the fiber segment substantially coinciding with an axis of rotation, the fiber segment being in a first angular position about the axis of rotation, imaging the end face of the fiber on a detector, measuring the location of the image of the center of the core relative to the location of the image of the center of the cladding in the first angular position, rotating the fiber segment about the axis of rotation to a second angular position and measuring the location of the image of the center of the core relative to the location of the image of the center of the cladding in the second angular position, rotating the fiber segment about the axis of rotation to a third angular position and measuring the location of the image of the center of the core relative to the image of the center of the cladding in the third angular position, and calculating the radius of the circle that circumscribes the locations of the image of the center of the core relative to the image of the center of the cladding.

2. A method of determining concentricity of an optical fiber segment composed of a cladding and a core, both substantially circular in cross-section, the fiber segment having an end face and the core and the cladding having respective centers in the end face, and the fiber segment having a central axis extending through the center of the cladding, the method including:

(a) positioning the fiber segment with the central axis of the fiber segment substantially coinciding with an axis of rotation, the fiber segment being in a first angular position about the axis of rotation, (b) employing an imaging system to create an image of the end face of the fiber, (c) measuring the location of the image of the center of the core relative to the location of the image of the center of the cladding in the first angular position, (d) effecting relative rotation of the fiber segment and at least one element of the imaging system about the axis of rotation to a second angular position and measuring the location of the image of the center of the core relative to the location of the image of the center of the cladding in the second angular position, (e) effecting relative rotation of the fiber segment and said at least one element of the imaging system about the axis of rotation to a third angular position and measuring the location of the image of the center of the core relative to the image of the center of the cladding in the third angular position, and (f) calculating the radius of the circle that circumscribes the locations of the image of the center of the core relative to the image of the center of the cladding.

3. A method according to claim 2, wherein the imaging system is a microscope including a lens and a detector and step (d) comprises effecting relative rotation of the fiber segment and the microscope and step (e) comprises effecting relative rotation of the fiber segment and the microscope.

* * * * *